US012145383B2

(12) United States Patent
Osakabe

(10) Patent No.: US 12,145,383 B2
(45) Date of Patent: Nov. 19, 2024

(54) PRINTING DEVICE

(71) Applicant: CASIO COMPUTER CO., LTD., Tokyo (JP)

(72) Inventor: Fumihiro Osakabe, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 146 days.

(21) Appl. No.: 17/748,979

(22) Filed: May 19, 2022

(65) Prior Publication Data

US 2022/0274423 A1 Sep. 1, 2022

Related U.S. Application Data

(63) Continuation of application No. 16/700,979, filed on Dec. 2, 2019, now Pat. No. 11,364,728.

(30) Foreign Application Priority Data

Dec. 3, 2018 (JP) ................................ 2018-226220

(51) Int. Cl.
*B41J 2/045* (2006.01)
*B41J 2/14* (2006.01)
(Continued)

(52) U.S. Cl.
CPC ...................................... *B41J 3/36* (2013.01)

(58) Field of Classification Search
CPC ......................................................... B41J 3/36
See application file for complete search history.

(56) References Cited

U.S. PATENT DOCUMENTS

2002/0054198 A1* 5/2002 Saijo ...................... B41J 2/2114 347/101
2005/0046668 A1 3/2005 Owaki
(Continued)

FOREIGN PATENT DOCUMENTS

CN 207643939 U 7/2018
JP 09248940 A 9/1997
(Continued)

OTHER PUBLICATIONS

CNIPA; App. No. 201911189384.5; First Office Action mailed Nov. 30, 2020.
(Continued)

*Primary Examiner* — Shelby L Fidler
(74) *Attorney, Agent, or Firm* — Fitch, Even, Tabin & Flannery LLP

(57) ABSTRACT

A handy printer includes a print head and a housing and prints a print subject on a print medium by moving the housing in a sub-printing direction. The print head includes print elements arranged linearly in a first direction. The housing has a bottom surface on which the print head is arranged. The bottom surface of the housing has a standard bottom surface portion, a concave bottom surface portion formed to be more distant from the print medium than the standard bottom surface portion, and a convex portion. The concave bottom surface portion is formed on an area of the bottom surface that is to pass above an area of the print medium on which printing is performed by the print head when the housing is moved in a second direction.

4 Claims, 16 Drawing Sheets

(51) Int. Cl.
*B41J 3/36* (2006.01)
*B41J 2/165* (2006.01)

(56) References Cited

U.S. PATENT DOCUMENTS

| | | | | |
|---|---|---|---|---|
| 2006/0192798 | A1 | 8/2006 | Kuki et al. | |
| 2006/0268087 | A1* | 11/2006 | Sasa | B41J 2/175 347/101 |
| 2007/0109339 | A1* | 5/2007 | Ahne | B41J 29/393 347/19 |
| 2007/0223982 | A1 | 9/2007 | Miller et al. | |
| 2008/0170900 | A1 | 7/2008 | James et al. | |
| 2019/0077157 | A1 | 3/2019 | Suwada | |
| 2019/0283452 | A1 | 9/2019 | Nishii et al. | |
| 2019/0283467 | A1* | 9/2019 | Nishii | B41J 11/04 |
| 2020/0094548 | A1* | 3/2020 | Nishioka | B41J 2/125 |

FOREIGN PATENT DOCUMENTS

| | | | |
|---|---|---|---|
| JP | 2015-189189 | A | 11/2015 |
| JP | 2016-087880 | A | 5/2016 |

OTHER PUBLICATIONS

JPO; Application No. 2018-226220; Notice of Reasons for Refusal dated Aug. 9, 2022.

* cited by examiner

PRINTING DEVICE

CROSS-REFERENCE TO RELATED APPLICATIONS

This application is a continuation of prior U.S. application Ser. No. 16/700,979, filed on Dec. 2, 2019, which claims the benefit of Japanese Patent Application No. 2018-226220 filed on Dec. 3, 2018, the entire disclosure of which is incorporated by reference herein.

FIELD

The present disclosure relates to a printing device.

BACKGROUND

A manual scanning type printing device is known that prints a print subject, such as characters, symbols, marks, and patterns on a print medium by a user manually moving the printing device with its housing grasped.

A manual scanning type printing device described in US Patent Application Publication No. 2007/0223982 includes a standard indicator arranged in the vicinity of the bottom surface of the housing, and a display that displays a relative positional relationship between the standard indicator and an image to be printed.

SUMMARY

According to an aspect of the present disclosure, a printing device includes (i) a print head that includes print elements arranged linearly in a first direction and (ii) a housing that has a bottom surface on which the print head is arranged. The bottom surface of the housing has a standard bottom surface portion, a second bottom surface portion, and a convex portion. A second distance between the second bottom surface portion and a flat plane on which the housing is to be placed is greater than a first distance between the standard bottom surface portion and the flat plane, and a third distance between the protrusion and the flat plane is less than the first distance. The housing is arranged in such a manner that the second bottom surface portion is made to pass above a print area of a print medium on which printing is performed by the print head when the print head continues to perform printing by moving the housing in a second direction intersecting the first direction after the print head performs printing on the print area.

BRIEF DESCRIPTION OF THE DRAWINGS

A more complete understanding of this application can be obtained when the following detailed description is considered in conjunction with the following drawings, in which.

DETAILED DESCRIPTION

A printing device (handy printer) according to an embodiment of the present disclosure is described below with reference to the drawings.

Figure 1:
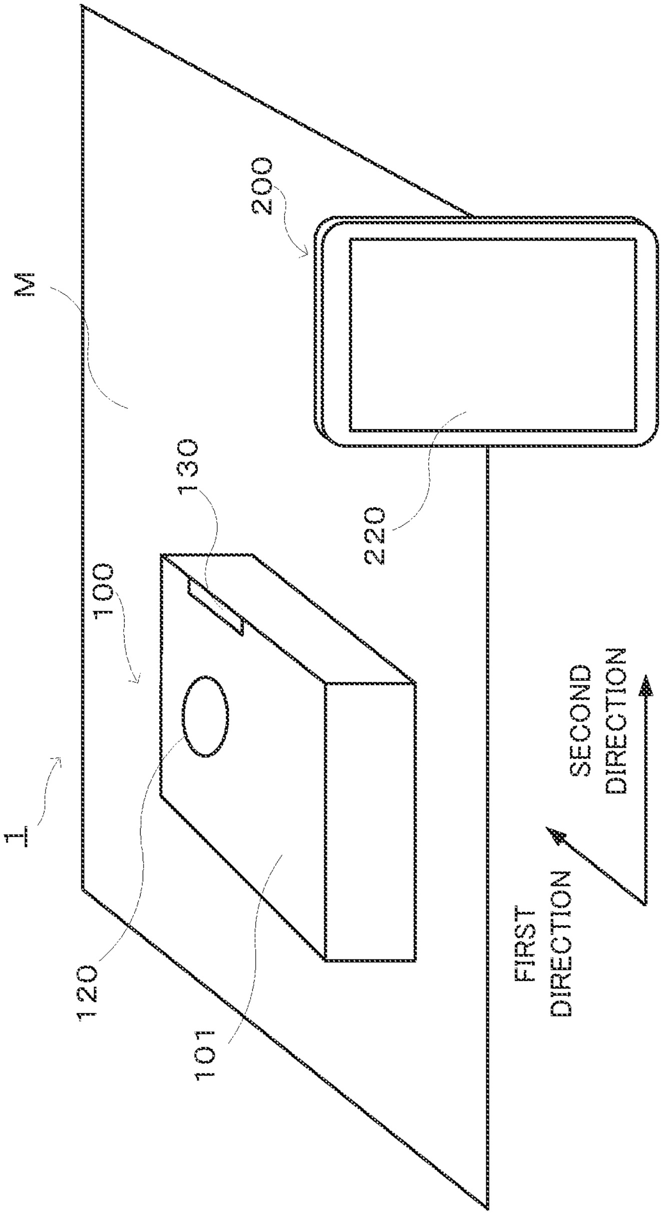
FIG. 1 is a drawing illustrating a handy printer and a terminal device according to an embodiment of the present disclosure.

A handy printer 100 according to an embodiment of the present disclosure includes a housing 101 sized to be easily grasped by a user by hand, as illustrated in FIG. 1. The handy printer 100 has a function of printing, while being moved by a user in a second direction that is a sub-printing direction, a print subject, such as characters, symbols, logos, icons, marks, and patterns, on a print medium M, and the handy printer 100 also has a function of printing for example, a character string that continues on multiple lines, an image or the like by repeating, in a first direction, an act of printing the print subject on the print medium in the second direction. Data indicating the print subject to be printed by the handy printer 100 is transmitted by a terminal device 200. Examples of the terminal device 200 include a smartphone or a tablet personal computer (PC), which is equipped with a display 220. The handy printer 100 and the terminal device 200 are configured to be communicatively connected to each other via a wireless link. A printing system 1 includes the handy printer 100 and the terminal device 200.

The handy printer 100 includes a determination button 120 receiving instructions to start printing the print subject and an indicator 130 that indicates a position at which the print subject is to be printed. A surface on which the determination button 120 is disposed is regarded as the upper surface of the handy printer 100.

The indicator 130 is formed to extend in a direction parallel to the first direction that is a main printing direction in which a below-described print head 150 is moved in order to print the print subject. The indicator 130 indicates, for a user, a direction in which the print subject is printed when the print subject is printed on the print medium M illustrated in FIG. 1. A length of the indicator 130 in the first direction is equal to a length of the below-described print head 150. The indicator 130 includes a light guide plate and a light emitting diode (LED).

Figure 2:
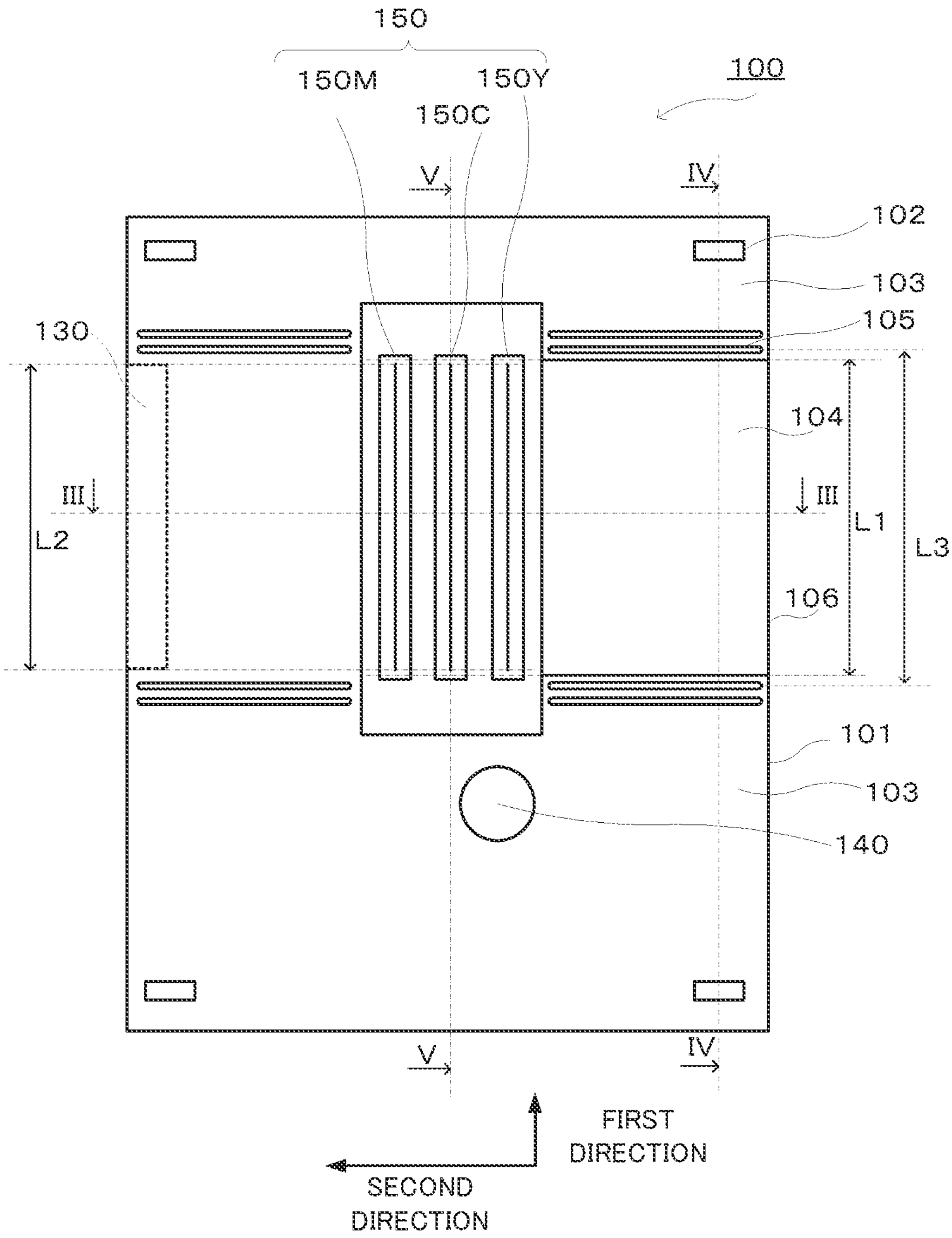
FIG. 2 is a bottom view illustrating the handy printer according to the embodiment of the present disclosure.

As illustrated in FIG. 2, a travel distance detector 140, the print head 150, and guide rollers 102 are disposed on the bottom surface of the handy printer 100. Also, the bottom surface of the handy printer 100 has a standard bottom surface portion 103, a concave bottom surface portion 104 (second bottom surface portion) that is more recessed than the standard bottom surface portion 103, and a convex portion 105 protruding from the standard bottom surface portion 103.

Figure 3:
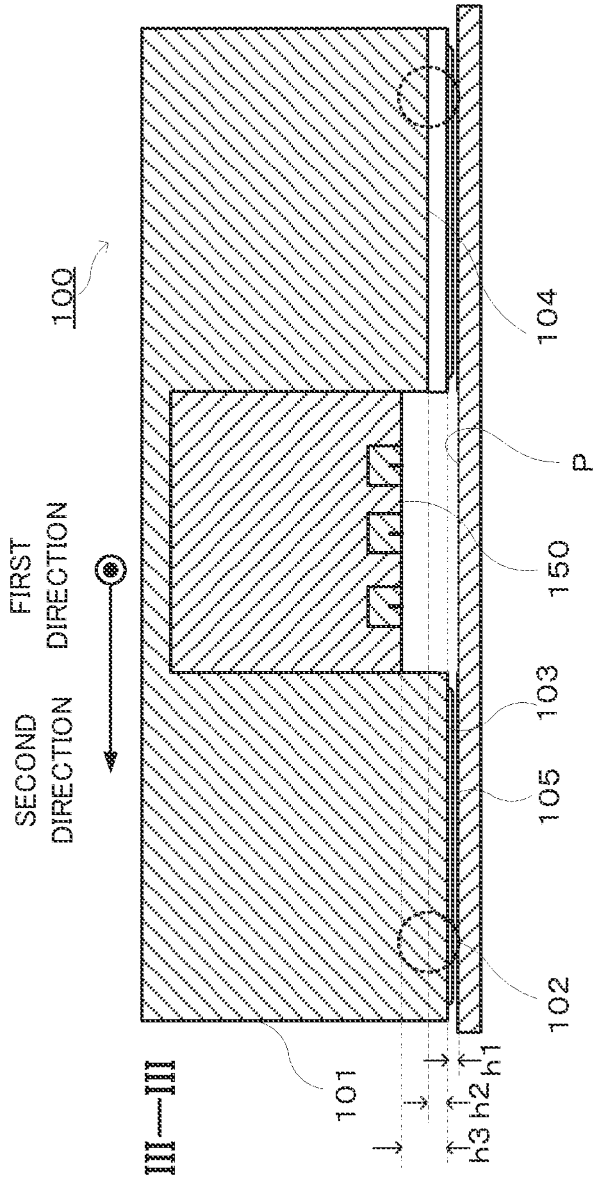
FIG. 3 is a cross-sectional view of the handy printer taken along line III-III in FIG. 2.
Figure 4:
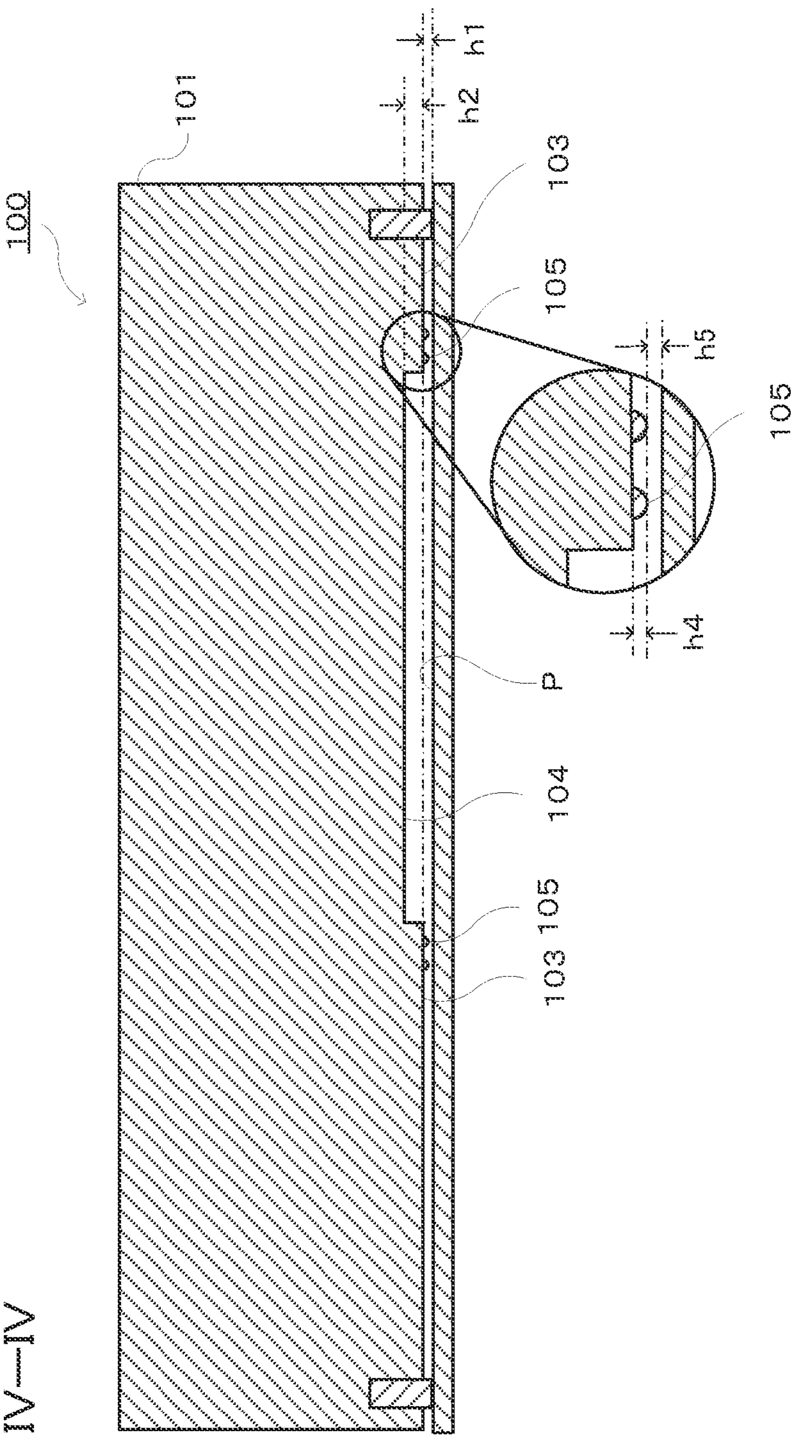
FIG. 4 is a cross-sectional view of the handy printer taken along line IV-IV in FIG. 2.
Figure 5:
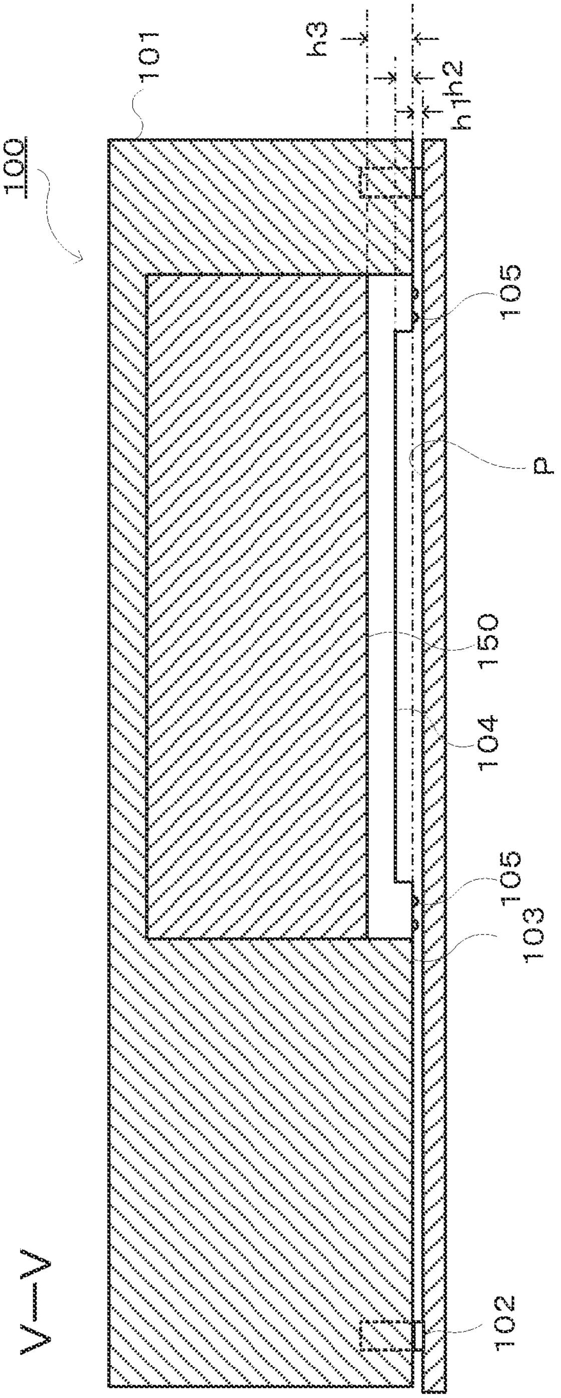
FIG. 5 is a cross-sectional view of the handy printer taken along line V-V in FIG. 2.

The guide rollers 102 are disposed on four corners of the bottom surface of the handy printer 100 and guide the handy printer to enable easy movement of the handy printer 100 in the second direction. As illustrated in FIGS. 3 to 5, each of portions of the guide rollers 102 protruding from the standard bottom surface portion has a height (first distance) of h1, and the guide rollers 102 function as a contact portion that touches the print medium M.

The standard bottom surface portion 103 has a planar shape and suppresses a crease occurring on the print medium M. When the handy printer 100 is put on a flat plate (flat plane) P, the standard bottom surface portion 103 is located at the height h1 above the flat plate P due to the guide rollers 102, thereby causing a gap between the flat plate P and the standard bottom surface portion 103 that has a gap width equal to the height h1. The height h1 is set to a height enabling the standard bottom surface portion 103 to suppress the crease occurring on the print medium M when the handy printer 100 is put on the print medium M. Specifically, the upper limit value of the height h1 is preferably 0.5 mm or more preferably 0.4 mm. The use of such an upper limit value of the height h1 enables the handy printer to suppress the crease occurring on the print medium M. The lower limit value of the height h1 is preferably 0.1 mm or more preferably 0.2 mm. The use of such a lower limit vale of the height h1 enables a reduction in friction between the standard bottom surface portion 103 and the print medium M.

The concave bottom surface portion 104 is formed on an area of the bottom surface extending from the print head 150 in a direction opposite to the second direction and is located at a position at which a distance between the standard bottom surface portion 103 and the concave bottom surface portion is h2 as viewed from the print medium M-side, that is, at a position at which the concave bottom surface portion is more recessed than the standard bottom surface portion by a depth an amount of which is equal to the distance h2. As illustrated in FIG. 2, a length L1 of the concave bottom surface portion 104 in the first direction is longer than a length L2 of the print head 150. The concave bottom surface portion 104 is formed on an area of the bottom surface extending from the print head 150 to an end portion 106 of the housing 101 in the second direction. The concave bottom surface portion 104 is formed on an area of the bottom surface of the handy printer that passes above an area (print area) of the print medium on which the print subject is printed by the print head 150 when the handy printer 100 is moved in the second direction. As illustrated in FIGS. 3 to 5, when the handy printer 100 is put on the flat plate P, a gap occurs between the flat plate P and the concave bottom surface portion 104 and has a gap width (second distance) equal to the height h1 plus the distance h2. The height h1 plus the distance h2 is set to a height (i) enabling the standard bottom surface portion to suppress the crease occurring on the print medium M and (ii) preventing the concave bottom surface portion 104 from scratching ink attaching to the print medium due to a printing process by the print head 150. The upper limit value of the height h1 plus the distance h2 is preferably 1.0 mm or more preferably 0.9 mm. The use of such an upper limit value of the height h1 plus the distance h2 enables the handy printer to suppress the crease occurring on the print medium M. The lower limit value of the height h1 plus the distance h2 is preferably 0.6 mm or more preferably 0.7 mm. The use of such a lower limit vale of the distance h2 can prevent the concave bottom surface portion 104 from scratching the ink attaching to the print medium due to the printing process by the print head 150.

The convex portion 105 is formed on the standard bottom surface portion 103 with the concave bottom surface portion 104 between the standard bottom surface portion 103 and the convex portion 105, is formed to extend in the second direction, and suppresses the crease occurring on the print medium M. A width L3 of the convex portion 105 illustrated in FIG. 2 is greater than the length L2 of the print head 150. Such a width of the convex portion 105 can prevent the convex portion 105 from touching a portion other than a portion on which the print subject is printed and from scratching the ink attached to the portion on which the print subject is printed by the print head 150. A height h4 of a portion of the convex portion 105 that protrudes from the standard bottom surface portion 103 is lower than the height h1 of each of the guide rollers 102, a gap (third distance) h5 between the flat plate P and the convex portion 105 is less than the gap h1 between the flat plate P and the standard bottom surface portion 103. Such a structure can both reduce friction between the convex portion 105 and the print medium M and suppress the crease occurring on the print medium M.

A travel distance detector 140 illustrated in FIG. 2 includes a light source such as a light emitting diode (LED) and an optical sensor and detects a distance by which the handy printer 100 is moved in the second direction.

The print head 150 includes a magenta-color print head 150M that ejects magenta-color ink, a yellow-color print head 150Y that ejects yellow-color ink, and a cyan-color print head 150C that ejects cyan-color ink. Each of the print heads 150M, 150Y, and 150C has nozzles, which are print elements, arranged linearly in the first direction. The first direction intersects the second direction. Preferably, the first direction is perpendicular to the second direction. The print head 150 ejects ink selectively from the nozzles upon electrical energization corresponding to an image of the print subject. A distance h3 between the standard bottom surface portion 103 and the print head 150 is greater than the distance h2. When the handy printer 100 is put on the flat plate P, a gap between the flat plate P and the print head 150 is equal to the distance h1 plus the distance h3. The distance h1 plus the distance h3 is preferably in the range of 1.5 mm to 2.0 mm. The use of such a structure enables the handy printer to print well.

Figure 6:
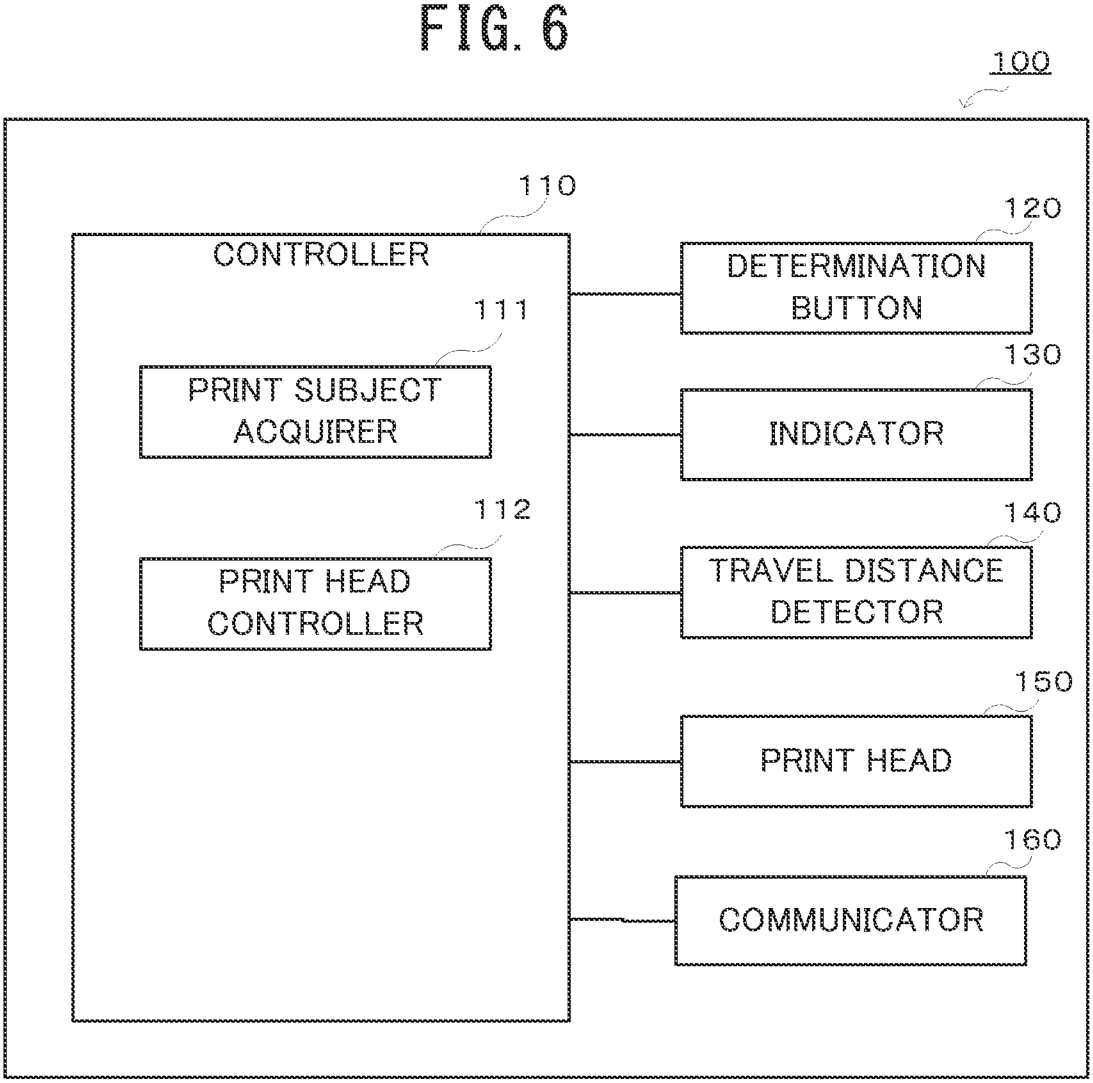
FIG. 6 is a block diagram illustrating a configuration of the handy printer according to the embodiment of the present disclosure.

As electrical components, the handy printer 100 includes the determination button 120, the indicator 130, the travel distance detector 140, and the print head 150, as described above, and further includes a controller 110 and a communicator 160, as illustrated in FIG. 6.

The controller 110 includes a central processing unit (CPU), a read only memory (ROM), and a random access memory (RAM). The ROM is a non-volatile type of memory, such as a flash memory, and the ROM stores programs for implementing various functions by the controller 110. The RAM is a volatile type of memory, and is used as working space for executing programs for processing by the controller 110. The RAM stores, for example, data indicating the print subject and transmitted by the terminal device 200. The controller 110 functions as a print subject acquirer 111 and a print head controller 112 by executing programs stored in the ROM.

The print subject acquirer 111 acquires, via the communicator 160, data indicating the print subject and transmitted by the terminal device 200 and stores the acquired data in the RAM.

The print head controller 112 controls the print head 150 so that the print head 150 prints, on the print medium M, the print subject acquired by the print subject acquirer 111. Specifically, the print head controller 112 controls the print head 150 so that the print head 150 prints a single line of dots of the corrected print subject as often as the handy printer 100 is moved by a distance corresponding to one dot pitch to perform printing.

The determination button 120 receives, in accordance with a user operation, an instruction to start moving the handy printer in the second direction.

As described above, the travel distance detector 140 detects a travel distance that is a distance by which the print head 150 is moved relative to the print medium M, and outputs to the controller 110 data indicating the detected travel distance.

The print head 150 selectively ejects, in accordance with print data, ink onto the print medium M through nozzles included in the print head 150 under control performed by the print head controller 112 as often as the handy printer is moved by a distance corresponding to one dot pitch in the second direction, as described above. The ejected ink attaches to the print medium M and a single line of dots, which is a line of dots arranged linearly in the first direction of the print head 150, is printed.

The communicator 160 receives data indicating the print subject from the terminal device 200. Examples of the communicator 160 include wireless communication modules, such as wireless local area network (LAN) and Bluetooth (registered trademark) modules.

Figure 7:
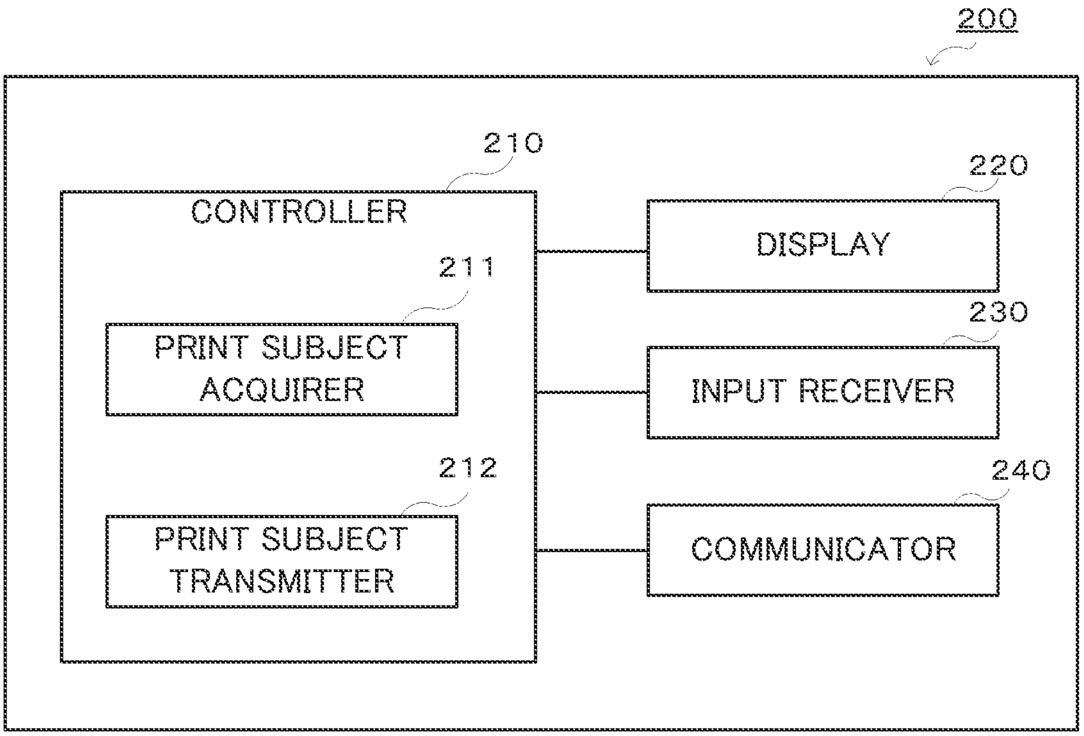
FIG. 7 is a block diagram illustrating a configuration of the terminal device according to the embodiment of the present disclosure.

As illustrated in FIG. 7, the terminal device 200 includes a controller 210, a display 220, an input receiver 230, and a communicator 240.

The controller 210 includes a CPU, a ROM, a RAM, and the like. The ROM is a non-volatile type of memory, such as a flash memory, and the ROM stores programs for implementing various functions by the controller 210. The RAM is a volatile type of memory, and is used as working space for executing programs for processing by the controller 210. The RAM stores data indicating the print subject. The controller 210 functions as a print subject acquirer 211 and a print subject transmitter 212 by executing programs stored in the ROM.

The print subject acquirer 211 acquires data indicating the print subject received through the input receiver 230 or the communicator 240.

The print subject transmitter 212 transmits, via the communicator 240 to the handy printer 100, the data indicating the print subject.

The display 220 displays the image of the input print subject and an image necessary for operation. Examples of the display 220 include a liquid crystal display (LCD).

The input receiver 230 receives, in response to a user input, the data indicating the print subject and instructions such as start and stop of printing processing. The input receiver 230 and the display 220 together form a touch panel display device.

The communicator 240 transmits to the handy printer 100 the data indicating the print subject. Similarly to the aforementioned communicator 160, examples of the communicator 240 include wireless communication modules, such as wireless LAN and Bluetooth (registered trademark) modules.

Next, a printing process performed by the handy printer 100 configured as above is described.

Figure 8:
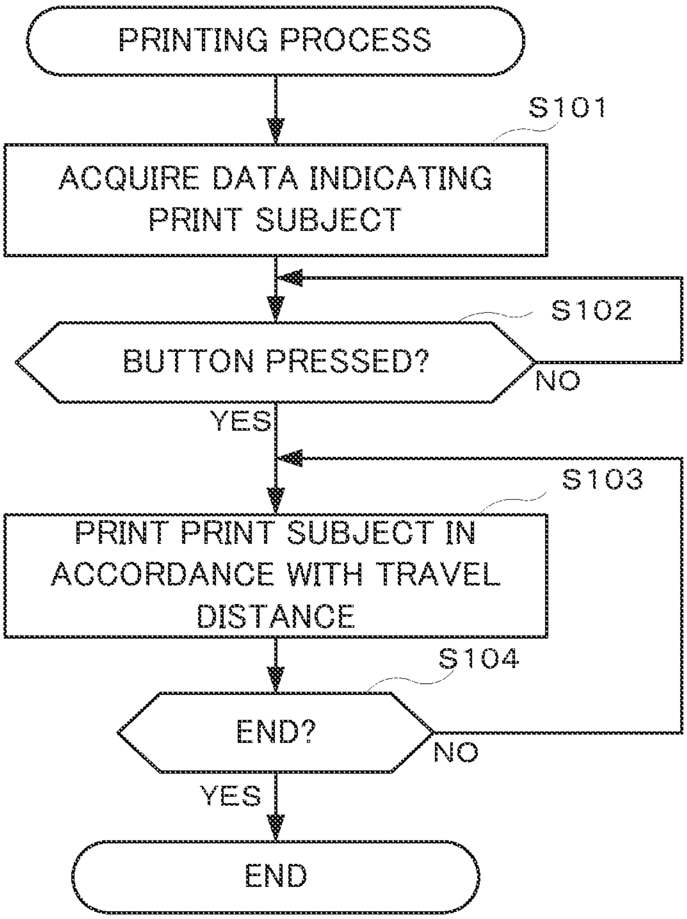
FIG. 8 is a flow chart illustrating a printing process executed by the handy printer according to the embodiment of the present disclosure.

In response to a user instruction to start processing, the handy printer 100 starts a printing process illustrated in FIG. 8. The printing process performed by the handy printer 100 is described below with reference to flow charts.

Upon transmitting, from the terminal device 200 by a user operation, the data indicating the print subject, the print subject acquirer 111 of the handy printer 100 acquires the data indicating the print subject via the communicator 160 and stores, in the RAM, the data indicating the print subject (Step S101). Next, the print head controller 112 determines whether the determination button 120 is pressed (Step S102). The print head controller 112 repeats Step S102 until the determination button 120 is pressed (No in Step S102). Upon pressing the determination button (Yes in Step S102), the print head controller 112 prints the print subject on the print medium M in accordance with the travel distance (Step S103). Specifically, the print head controller 112 prints a single line of dots of the image of the print subject as often as the handy printer is moved by a distance corresponding to one dot pitch. Next, the print head controller 112 determines whether printing of the print subject is completed (Step S104). If the print head controller 112 determines that printing of the print subject is not completed (No in Step S104), the print head controller 112 repeats Steps S103 to S104. If the print head controller 112 determines that printing of the print subject is completed (Yes in Step S104), the print head controller 112 ends the printing process.

Next, a concrete example of the printing process performed by the handy printer 100 according to the present embodiment so that the print subject is printed on the print subject is described with reference to FIGS. 9 and 10.

Figure 9:
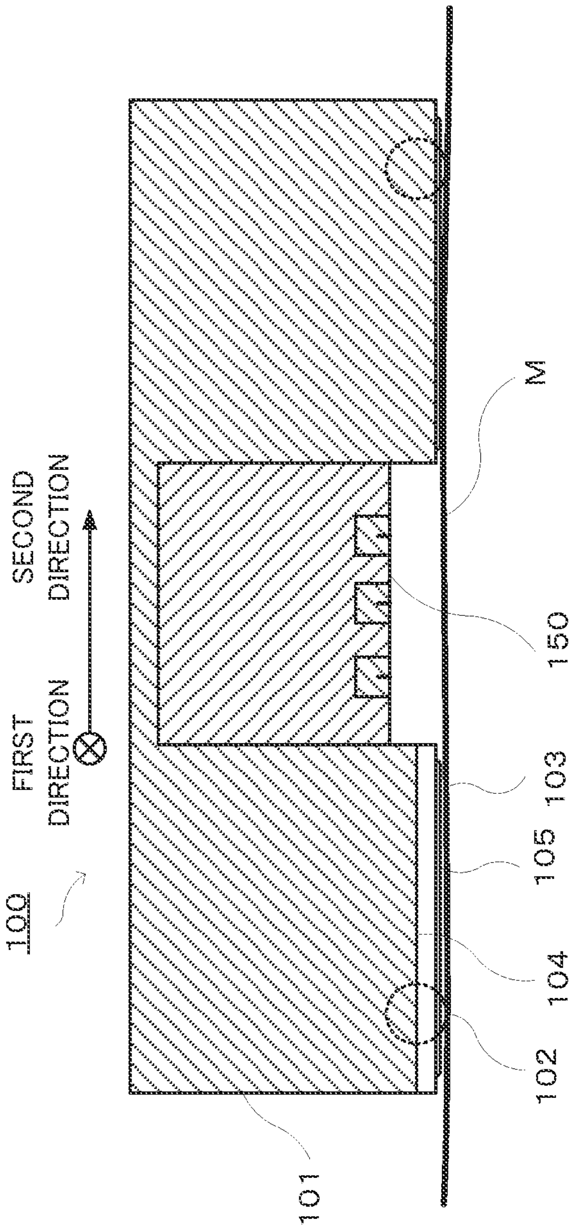
FIG. 9 is a drawing for description of the printing process executed by the handy printer according to the embodiment of the present disclosure.
Figure 10:
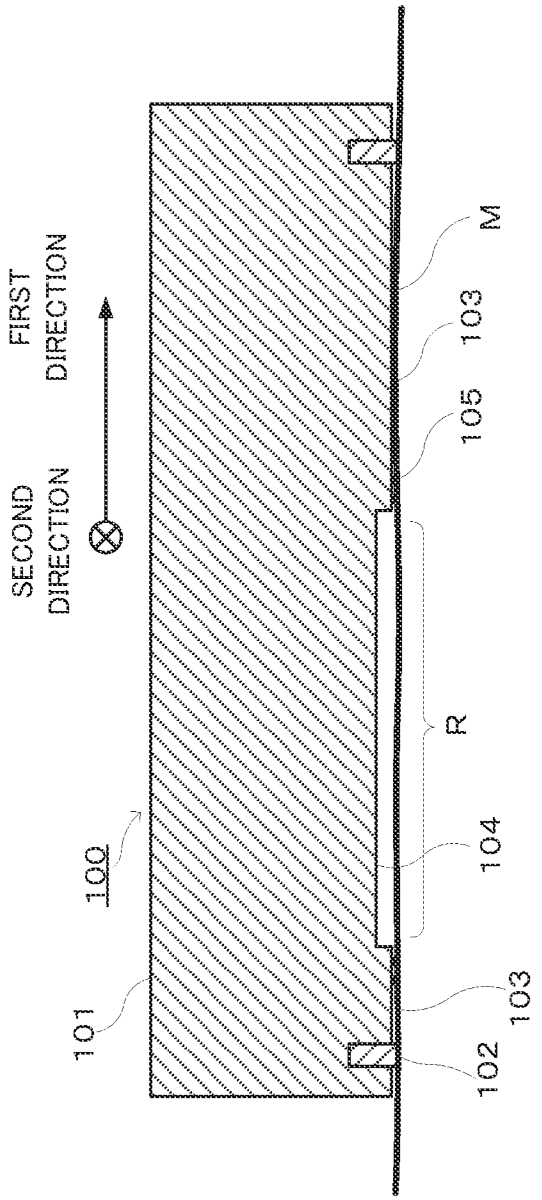
FIG. 10 is a drawing for description of the printing process executed by the handy printer according to the embodiment of the present disclosure.

When the user puts the handy printer 100 on the print medium M, as illustrated in FIGS. 9 and 10, the standard bottom surface portion 103 and the convex portion 105 suppress the crease occurring on the print medium M. Also, upon pressing the determination button by the user (Yes in Step S102 in FIG. 8) and then moving the handy printer 100 in the second direction, the handy printer 100 is guided by the guide rollers 102 in the second direction to be moved. The guide rollers 102 protrudes from the standard bottom surface portion 103 by the height h1, thereby enabling the handy printer to be moved with the standard bottom surface portion 103 kept above the print medium M. At this point, when the print medium M is creased, the convex portion 105 comes into contact with the print medium M to press out the crease occurring on the print medium M. Upon moving the handy printer 100, the print head controller 112 prints the print subject on the print medium M in accordance with the travel distance (Step S103 in FIG. 8). At this point, the concave bottom surface portion 104 passes above an area R on which the print head controller 112 performs the printing process. Since the concave bottom surface portion 104 is more recessed than the standard bottom surface portion 103, the concave bottom surface portion 104 does not scratch the ink attaching to the print medium M due to the printing process by the print head controller 112. Also, in a case in which the print medium M is severely creased, the concave bottom surface portion 104 suppresses the severe crease of the print medium M.

As described above, in the handy printer 100 according to the present embodiment, the standard bottom surface portion 103, the convex portion 105, and the concave bottom surface portion 104 suppress the crease occurring on the print medium M. Additionally, the concave bottom surface portion 104 is more recessed than the standard bottom surface portion 103, thereby preventing the print head controller 112 from scratching ink attaching to the print medium due to the printing process by the print head controller 112. As a result, the handy printer 100 can print the print object on the print medium M without causing a reduction in print quality. Additionally, the handy printer 100 includes the guide rollers 102, thereby enabling the handy printer 100 to be easily moved in the second direction by a user operation. As a result, the user can move the handy printer 100 straight in the second direction. Also, the guide rollers 102 protrude from the standard bottom surface portion 103, thereby reducing friction between the standard bottom surface portion 103 and the print medium M.

Figure 11:
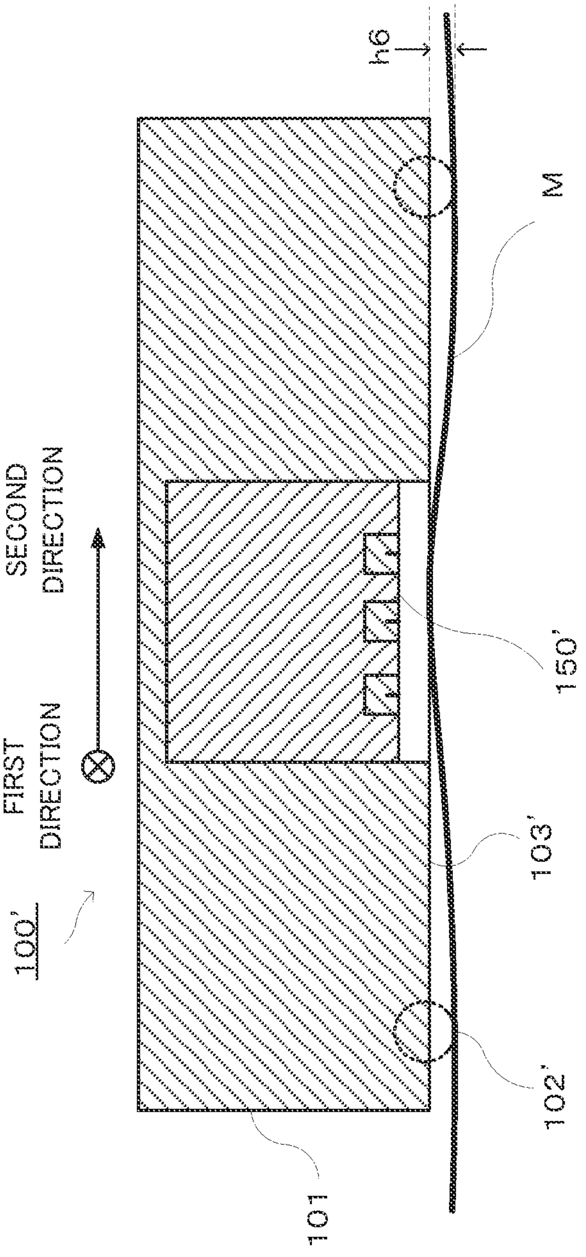
FIG. 11 is a cross-sectional view of a handy printer of a comparative example.
Figure 12:
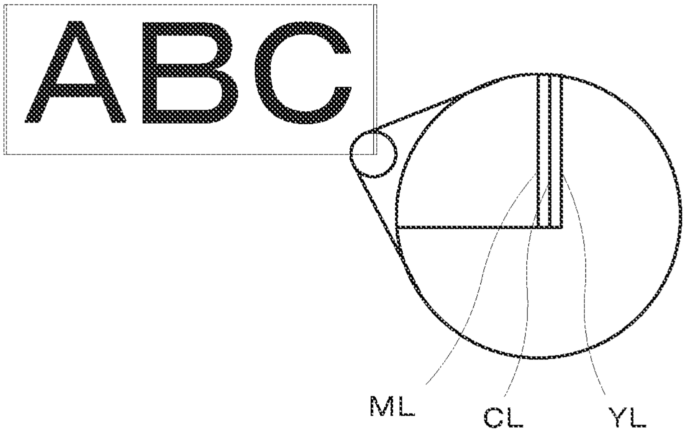
FIG. 12 is a drawing for description of a print subject printed by the handy printer of the comparative example.
Figure 13:
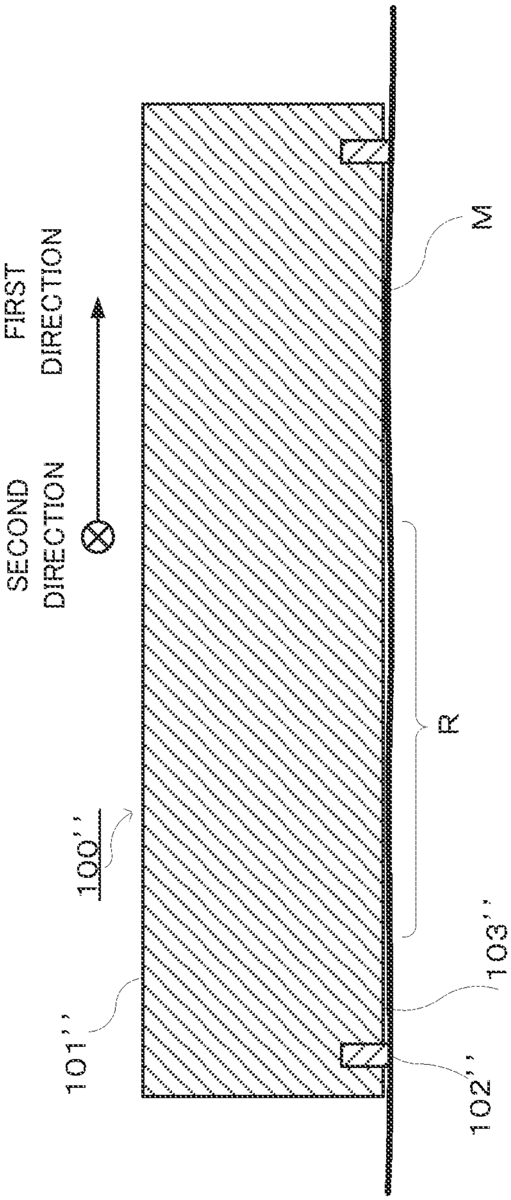
FIG. 13 is a cross-sectional view of a handy printer of another comparative example.
Figure 14:
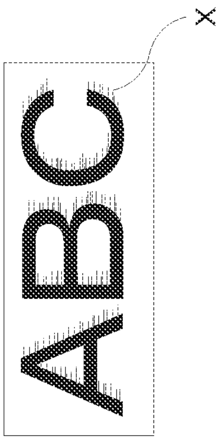
FIG. 14 is a drawing for description of the print subject printed by the handy printer of the other comparative example.

In contrast, in a case in which portions of the guide rollers 102 protruding from the a standard bottom surface portion 103' have a high height h6 as in a handy printer 100' illustrated in FIG. 11, a crease occurs on the print medium M during an operation of the print head 100'. When a printing process is performed with the print medium M creased, as illustrated in FIG. 12, the crease on the print medium causes misalignment of a dot line ML printed by a magenta-color print head 150M', a dot line YL printed by a yellow-color print head 150Y' and a dot line CL printed by a cyan-color print head 150C', thereby causing a reduction in print quality. Also, as in a handy printer 100" illustrated in FIG. 13, the handy printer 100" does not include the concave bottom surface portion 104, an area R' on which the print head performs a printing process comes into contact with a standard bottom surface portion 103" and the print medium M, and thus the standard bottom surface portion 103" scratches ink attaching to the print medium 103' due to the printing process by the print head. In this case, as illustrated in FIG. 14, scuffs X caused by the standard bottom surface portion 103 scratching the ink causes the reduction in print quality.

Modified Embodiments

Figure 15:
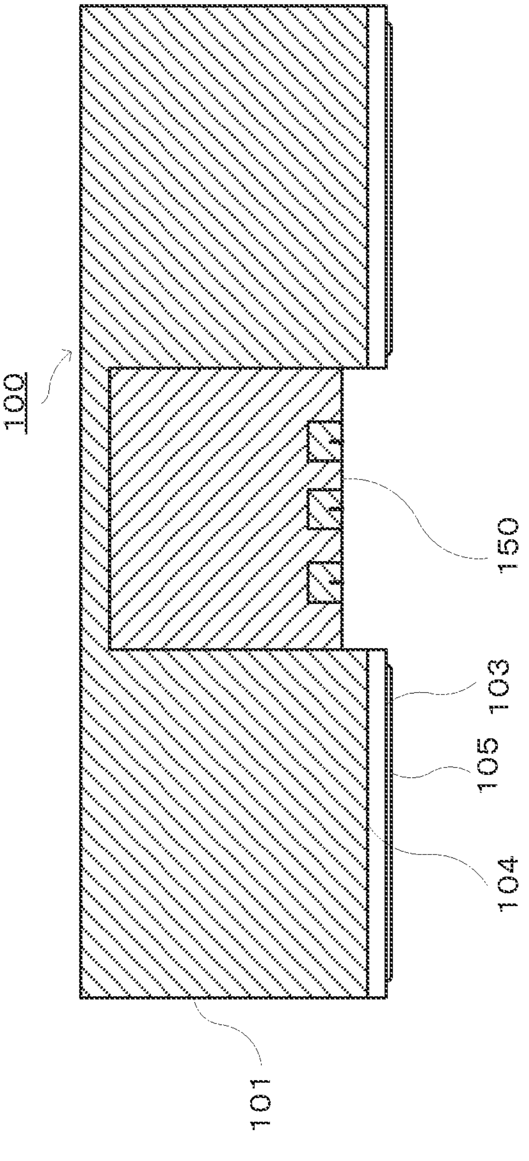
FIG. 15 is a cross-sectional view of the handy printer according to a modified embodiment of the present disclosure.

In the aforementioned embodiment, the handy printer 100 includes the guide rollers 102. However, as illustrated in FIG. 15, there is no need for the handy printer 100 to include the guide rollers 102. In this case, the standard bottom surface portion 103 and the convex portion 105 may be formed, for example, as a low friction portion subjected to fluorine resin processing. By such a manner of forming the standard bottom surface portion 103 and the convex portion 105, the print medium M is pressed out by the standard bottom surface portion 103, thereby suppressing the crease occurring on the print medium M.

Figure 16:
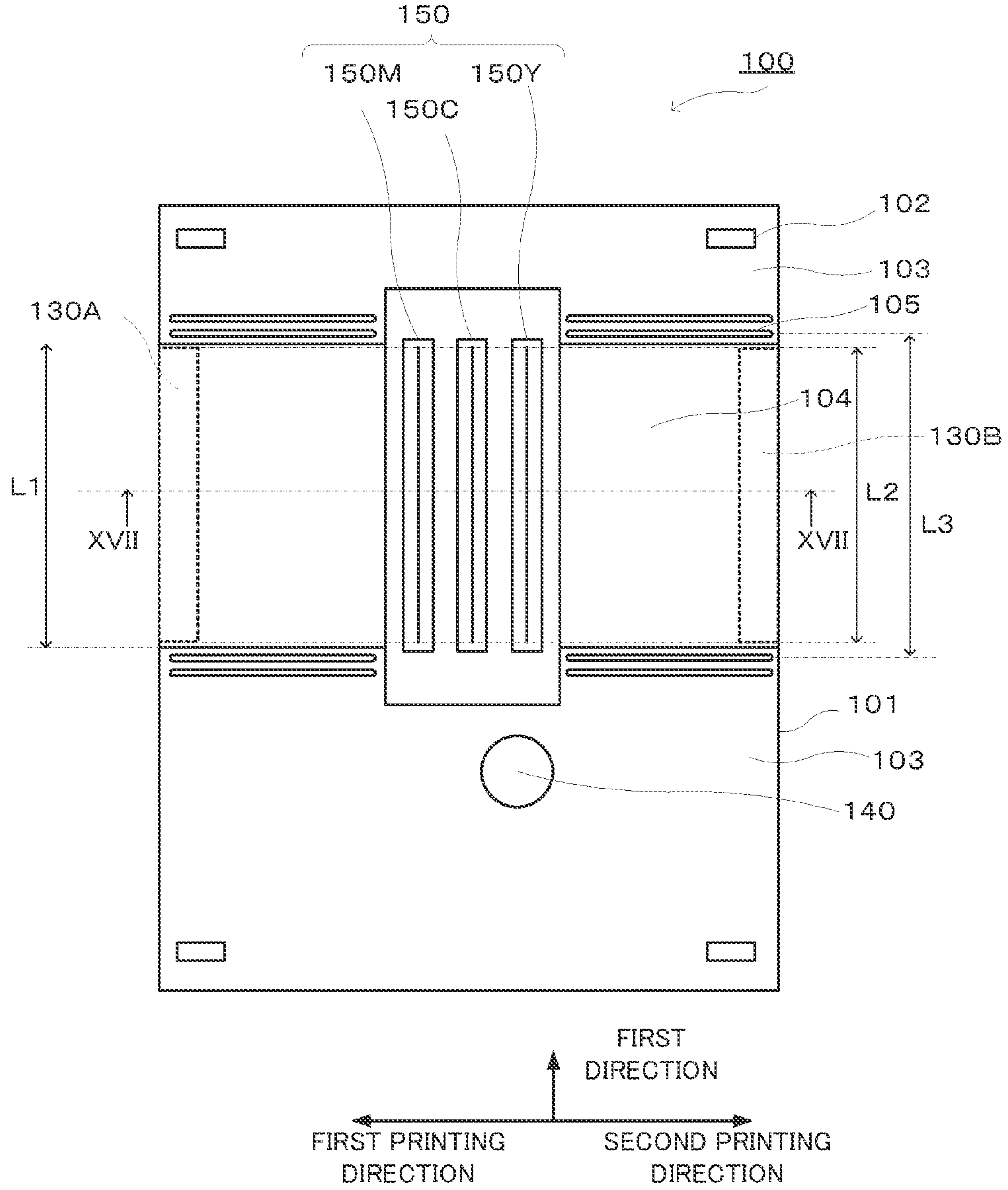
FIG. 16 is a bottom view illustrating the handy printer according to the modified embodiment of the present disclosure.
Figure 17:
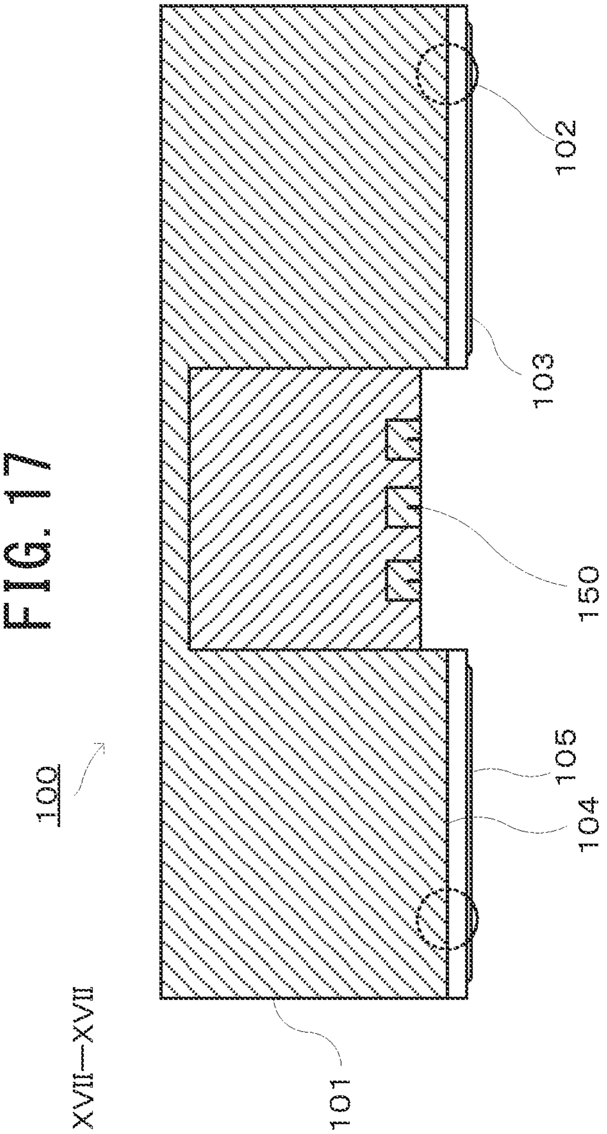
FIG. 17 is a cross-sectional view of the handy printer taken along line XVII-XVII in FIG. 16.

In the aforementioned embodiment, the handy printer 100 is moved in the second direction in order to print the print subject. However, in this case, as illustrated in FIGS. 16 and 17, the second direction may include a first printing direction and a second printing direction opposite to the first printing direction, the handy printer 100 may be moved in the first printing direction and the second printing direction in order to print the print subject. The concave bottom surface portion 104 is formed both on an area of the bottom surface of the housing extending in the first printing direction from the print head 150 and on an area of the bottom surface of the housing extending in the second printing direction from the print head 150. Such a structure enables the housing to suppress the crease occurring on the print medium M both in a case in which the handy printer 100 is moved in the first printing direction in order to print the print subject and in a case in which the handy printer 100 is moved in the second printing direction in order to print the print subject, thereby preventing the concave bottom surface portion 104 from scratching the ink attaching to the print medium M due to the printing process by the print head controller 112. This handy printer 100 may include a first indicator 130A to indicate the first printing direction and a second indicator 130B to indicate the second printing direction. Such a structure enables the handy printer to show the user a direction in which the handy printer is moved.

In the aforementioned embodiment, the print head 150 includes the magenta-color print head 150M, the cyan-color print head 150C, and the yellow-color print head 150Y. However, the print head 150 may be a print head that ejects one or two colors of ink or four or more colors of ink. For example, the print head 150 may be a black-color print head that ejects black-color ink. Also, the print head 150 is of an ink jet type with linearly arranged nozzles, but the print head 150 has only to have a structure for printing the print subject and may be of another type.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A printing device including a print head having nozzles arranged linearly in a first direction for each of mutually different color components, the printing device being to perform printing on a print medium by ejection of ink from the nozzles while being moved relative to the print medium in a second direction that is perpendicular to the first direction, the printing device comprising:

a first convex portion and a second convex portion that are arranged linearly along the second direction so as to be parallel to each other; and a guide roller to regulate the printing device so as to move relative to the print medium in the second direction, wherein the first convex portion and the second convex portion are arranged on a surface such that the print head is disposed at a position deviated from an area between the first convex portion and the second convex portion in the second direction, the surface being to face the print medium when the printing on the print medium is performed, the area between the first convex portion and the second convex portion has, along the second direction, a recessed area that is more recessed than areas in which the first convex portion and the second convex portion are arranged, a length of the recessed area in the first direction is longer than a length of the print head in the first direction, and a protrusion amount of the guide roller from the surface is larger than protrusion amounts of the first convex portion and the second convex portion from the surface.

2. The printing device according to claim 1, wherein the first convex portion and the second convex portion are arranged such that the print head is disposed at a position deviated from the area between the first convex portion and the second convex portion on a front side in the second direction, the printing device further comprises a third convex portion and a fourth convex portion that are arranged linearly along the second direction so as to be parallel to each other, and the third convex portion and the fourth convex portion are arranged on the surface such that the print head is disposed at a position deviated from an area between the third convex portion and the fourth convex portion on a rear side in the second direction.

3. A printing device including a print head having nozzles arranged linearly in a first direction for each of mutually different color components, the printing device being to perform printing on a print medium by ejection of ink from the nozzles while being moved relative to the print medium in a second direction that is perpendicular to the first direction, the printing device comprising:

a first convex portion and a second convex portion that are arranged linearly along the second direction so as to be parallel to each other; and a first guide roller and a second guide roller, the first guide roller and the second guide roller being to regulate the printing device so as to move relative to the print medium in the second direction, wherein the first convex portion and the second convex portion are arranged on a surface such that the print head is disposed at a position deviated from an area between the first convex portion and the second convex portion in the second direction, the surface being to face the print medium when the printing on the print medium is performed, the area between the first convex portion and the second convex portion has, along the second direction, a recessed area that is more recessed than areas in which the first convex portion and the second convex portion are arranged, a length of the recessed area in the first direction is longer than a length of the print head in the first direction, and a protrusion amount of each of the first guide roller and the second guide roller from the surface is larger than protrusion amounts of the first convex portion and the second convex portion from the surface.

4. The printing device according to claim 3, wherein the first guide roller and the second guide roller are arranged such that the first convex portion and the second convex portion are disposed between the first guide roller and the second guide roller in the first direction.

* * * * *